May 4, 1937.　　　　C. JOHNSON　　　　2,079,069
PRESSURE RESPONSIVE DEVICE
Filed Oct. 13, 1934
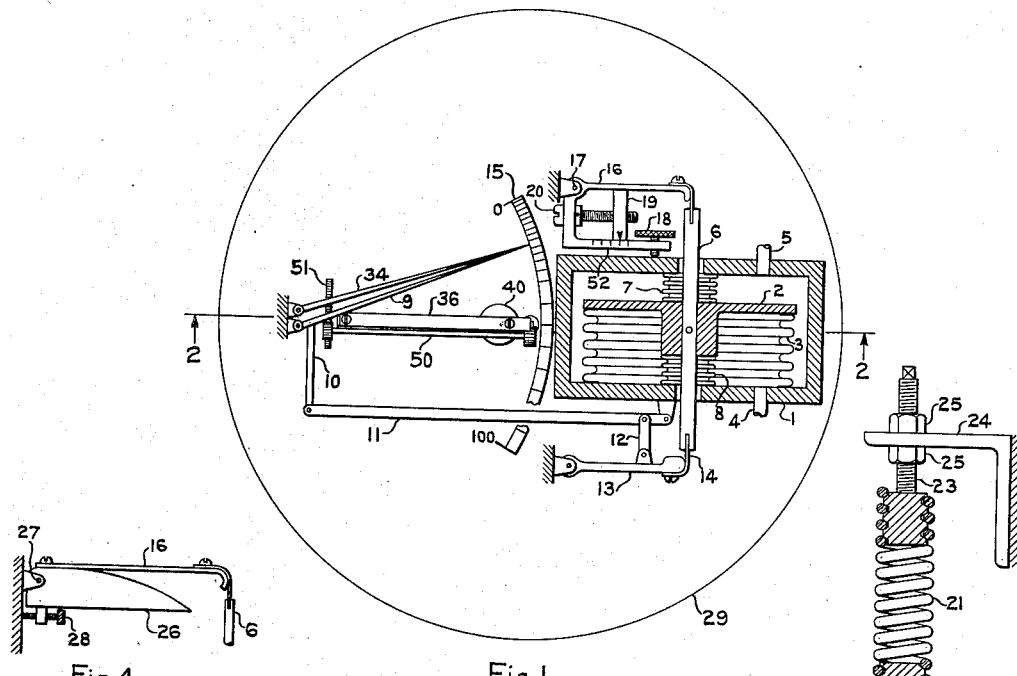
Fig.1
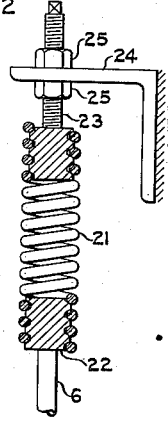
Fig.3
Fig.4
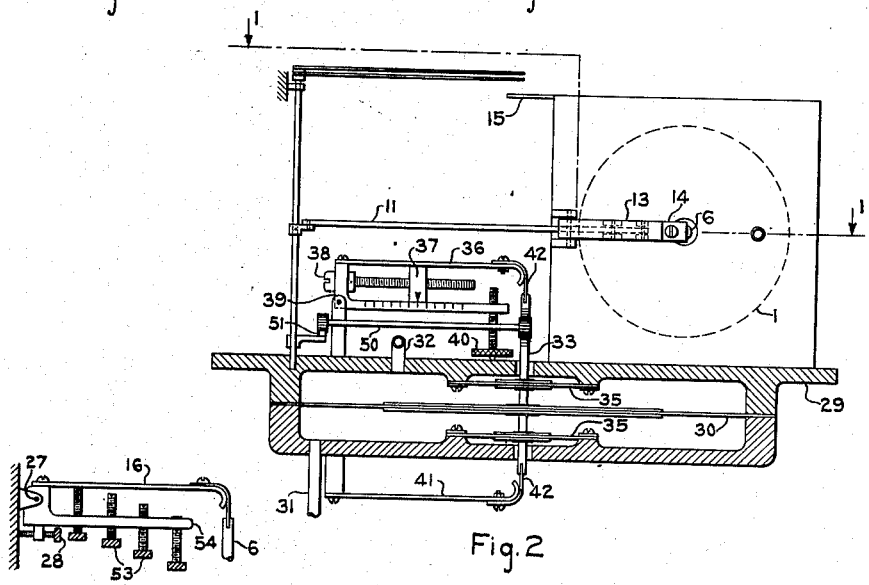
Fig.2
Fig.5
INVENTOR
Clarence Johnson
BY
Raymond D. Junkins
ATTORNEY Patented May 4, 1937

2,079,069

UNITED STATES PATENT OFFICE 2,079,069

PRESSURE RESPONSIVE DEVICE

Clarence Johnson, East Cleveland, Ohio, assignor to Bailey Meter Company, a corporation of Delaware Application October 13, 1934, Serial No. 748,181

13 Claims. (Cl. 73—110)

This invention relates to pressure responsive and/or measuring devices, such for example as pressure gages, differential pressure gages, rate of flow meters, etc. It relates particularly to devices which are responsive or sensitive to the value of a pressure or pressure differential and utilizes such responsiveness to give a visual indication of the value, or to actuate control mechanism or similar apparatus. It is particularly related to pressure relation gages for exhibiting the relation existing between two or more pressures.

By "pressure differential" I mean the difference between any two pressures of which one may be the pressure of the atmosphere. It will be understood that by pressure I may mean a pressure greater than, less than, or that of the atmosphere. Furthermore that a pressure may be indicative of any variable factor, or may represent such factor, as for example, a vapor tension type of thermometer for measuring a temperature may provide a variable pressure to be measured in terms of temperature.

An object of the invention is to provide a device wherein the pressure necessary to produce full scale deflection of a pointer or similar exhibiting device may be varied at will and over a wide range.

A further object is to provide a measuring device which may be operated in any position and is entirely free from the use of sealing liquids, such as mercury, oil, etc.

Another object is to provide such a device wherein a movable shaft is carried through the wall of a pressure chamber without the use of stuffing glands or pressure tight bearings.

A still further object is to provide a construction wherein the magnitude of a function of the actuating condition may be indicated, rather than the magnitude of the condition itself.

My invention further contemplates the combination of such pressure responsive devices in new and novel manner to provide for a ready comparison of a plurality of related variable factors.

These and other objects will become apparent from the following description taken in connection with the drawing, in which:

Fig. 1 is a partially sectioned view, in the direction of the arrows, along the line 1—1 of Fig. 2.

Fig. 2 is a partially sectioned view, in the direction of the arrows, along the line 2—2 of Fig. 1.

Figs. 3, 4 and 5 each illustrate in modified form a part of the mechanism of Figs. 1 and 2.

In the drawing I have shown two principal views of the assembly, and it is immaterial which is the plan and which the elevation, for one of the advantages of my invention is that the pressure responsive device may be placed in any horizontal, vertical or other position and operate satisfactorily and accurately.

In the principal views I have sectioned a part of each; in Fig. 1 through one differential pressure responsive chamber, and in Fig. 2 through a second differential pressure chamber, the whole constituting a relation determining gage for two differential pressures.

I have shown my improved device adapted to determine the magnitude of two differential pressures and so arranged as to provide for their ready comparison. These differential pressures may be indicative of related factors, such for example as the rate of steam flow from a boiler and the rate of flow of the products of combustion or air through such a boiler, wherein as is well known for maximum operating efficiency the flows should bear a certain relation to each other. It will be apparent to those skilled in the art however that the arrangement is readily adaptable to other uses and may easily be arranged for the ready comparison of any related factors. Furthermore that the device may be useful in the determination of but a single differential pressure, which may be for example the rate of flow of a fluid through a conduit, such as the rate of flow of steam, water, oil, etc.; or in fact the arrangement may be used in determining the value of a pressure relative to the atmosphere or to another pressure.

Referring first to Fig. 1, I have therein shown a pressure chamber 1 in which is located an expansible-contractible, closed, cylindrical, metallic bellows 2 having a plurality of convolutions 3. The bellows 2 is pressure sealed to one side of the chamber 1 and is adapted to expand and contract in accordance with the difference in pressure existing between its interior and exterior. The chamber 1 is provided with pressure inlets 4 and 5, which may lead to sources of pressure, the difference in which it is desired to indicate. In the present example these pressures are those existing at the inlet and outlet sides of an orifice or other pressure differential producing device located in a conduit through which steam flows from a boiler, and as is well known in the art producing a differential pressure bearing a functional relation to the rate of flow through the conduit.

For transmitting motion of the bellows 2 to the exterior of the pressure chamber 1 so that the difference in pressures existing across the bellows may readily be observed, I have provided a shaft 6 secured thereto. In devices of this type, it is essential that they be adapted to measure differential pressures of a relatively small magnitude and to do this accurately, it is necessary that they be as friction free as possible. To permit the motion of the bellows 2 to be carried to the outside of the pressure chamber 1 without the introduction of undue friction, I have provided small expansible-contractible, cylindrical metallic bellows 7 and 8 which are pressure sealed to the wall of the pressure chamber 1 and to the bellows 2 and effectively seal the pressure fluid within the pressure chamber 1 or bellows 2 from leakage through the openings provided for the shaft 6. The bellows 7 and 8 are easily flexed either longitudinally in a direction parallel to their axes or transversely in a radial direction and, therefore, do not interfere in any way whatsoever with the accurate positioning of the bellows 2 in accordance with the difference in pressures. The openings in the wall of the pressure chamber 1 through which the shaft 6 passes are also made relatively large so that the shaft 6 is not constrained but may oscillate angularly or assume a position at an angle with the axis of the pressure chamber 1. It is apparent from the foregoing description that the bellows 2 and the members positioned thereby constitute a free floating body unconstrained in any manner whatsoever by frictional forces.

Movements of the shaft 6 are transmitted to a pointer 9 through a suitable motion multiplying linkage comprising links 10, 11, 12, and 13. The shaft 6 is connected to the horizontally pivoted link 13 through a suitable flexible strap 14. The pointer 9 cooperates with an index 15 which may be suitably graduated so that the position of the bellows 2 within the pressure chamber 1 may be readily observed.

So that the position assumed by the bellows 2 will be proportional to the intensity of the differential pressure transmitted through the inlets 4 and 5, I have provided a counterbalance comprising a cantilever spring 16 supported by a pivot 17. The force produced by the differential pressures acting on the bellows 2 will thus act to deflect the spring 16 in a clockwise direction about the pivot 17. As there is a straight line relation between the deflection of a spring and the force necessary to produce that deflection, it follows that movements of the shaft 6 will be in direct proportion to the difference in pressures existing between the interior and exterior of the bellows 2. I have shown the spring 16 pivoted at 17 and provided with an adjustable stop 18 so that with equal pressures within and without the bellows 2, (for example with both 4 and 5 open to the atmosphere), the index 9 may be readily adjusted to the zero position or mark on the scale 15.

It is desirable in devices of this type, particularly when used to measure the rate of flow of a fluid through a conduit, that the differential pressure necessary to produce maximum deflection of the pointer 9 be readily adjustable. For example, at certain times, such as on Sundays and holidays, the rate of steam flow from the boiler may be exceedingly small. Unless the small differential pressure thus produced were spread out over the entire range of the scale 15, it would be quite difficult to observe relatively large percentage variations in the small flow.

Furthermore it will be observed that where a differential pressure is being measured to determine the rate of flow of a fluid, there is a quadratic relation existing between the two, and the scale 15 will be graduated unequally according to this quadratic relation, and with the graduations which are closest together at the minimum flow end of the scale. Thus if the flow is of very small magnitude it will be even more difficult to observe the actual value of flow or changes of flow upon the scale.

It will of course be apparent that if the pressures or differential pressures are not those resulting from a measurement of a flowing fluid, and therefore have no quadratic or other relation to differential pressures, then the graduations of the scale 15 may be equal or otherwise as found desirable.

To provide a means for readily changing the differential pressure necessary to produce maximum deflection of the indicator 9, I have provided the spring 16 with a movable fulcrum 19 adapted to be positioned along the spring 16 by means of the screw 20. When the fulcrum 19 is at the extreme left position as viewed in the drawing, substantially all of the spring 16 will be effective and the differential pressure necessary to produce maximum deflection of the bellows 2 will be at a minimum. When, however, the movable fulcrum 19 is moved to the extreme right position only a small portion of the spring 16 will be effective and a materially greater differential pressure will be necessary to produce maximum deflection of the bellows 2. In other words, I have provided a means for varying the effective length of the spring 16 and thereby the maximum capacity of the measuring device.

In Fig. 3 I have shown an alternate arrangement of the counterweighting spring wherein I use a coil or helical spring 21 in place of the cantilever spring 16. With this construction, the shaft 6 is threaded into the helical spring 21 by means of a head 22. The helical spring 21 is likewise supported at the other end by means of a similar threaded head which forms an extension of a threaded shaft 23 passing through a support 24 and threaded to lock nuts 25. When, for example, it is desired to adjust the zero position of the bellows 2, one or the other of the lock nuts 25 is loosened depending upon whether it is desired to position the pointer 9 in a clockwise or counter clockwise direction and the other lock nut is tightened until the pointer 9 assumes the desired position. When it is desired to change the maximum differential pressure necessary to produce maximum deflection of the bellows 2, the shaft 23 is rotated, thus increasing or decreasing the effective length of the helical spring 21 between the heads 22, 23.

As is well known, the differential pressure produced across an orifice, flow nozzle or other element located in a conduit through which a fluid flows, varies as the square of the rate of flow of fluid. It is frequently desirable that the pointer 9 be positioned directly proportional to the rate of flow of fluid rather than in direct proportion to the differential pressure. To effect this desirable result, I provide a means whereby the pointer 9 will be positioned in accordance with the square root of the difference in pressure existing across the bellows 2. (See Fig. 4.)

In Fig. 4 I have disclosed a modification wherein I provide means for continuously modifying or progressively varying the effective length of the spring 16. I therein show the spring 16 secured at the outer end to the shaped member 26. As the shaft 6 is positioned downwardly due to an increasing differential pressure impressed across the bellows 2, a progressively greater portion of the spring will come in contact with the member 26 and thereafter become rigid, thus reducing the effective length of the spring 16 and thereby requiring a greater increase in differential pressure to produce a unit deflection of the spring. It is evident that the member 26 may be shaped to effect any functional relation desired between the differential pressure or other force actuating the bellows 2, and motion of the pointer 9, and is not limited to the exact shape or form shown in Fig. 4. To provide for adjustment of the pointer 9, the member 26 may be pivoted about a support 27 and adapted to be positioned about the support by means of the adjusting screw 28.

Fig. 5 is similar to Fig. 4, except that herein I have provided means, namely the screws 53, threaded through the bell crank base 54 to any desired extent so that their upper ends produce a contour of contact with the spring 16 as may be desired. Thus I may readily vary the effective relation between movement of the bellows 2 and indication relative to the index 15 to meet the quadratic or other law.

Referring again to Fig. 1, I illustrate at 52 graduations on the bell crank relative to a pointer on the movable fulcrum 19. The scale 52 may be calibrated in terms of maximum pressure, differential pressure, or flow, for example, corresponding to full deflection of the bellows 2.

As hereinbefore indicated, it is frequently desirable to compare the relative rate of flow of two fluids or of other factors which may enter into the operation of power producing or using apparatus and which in order to maintain maximum operating efficiency must bear a predetermined relation to each other. In order to readily compare such rates of flow or factors, it is desirable that their magnitude be indicated by pointers cooperating with the same scale so that the existence or non-existence of the desired ratio may be readily determined. My invention, therefore, contemplates the novel combination of such gages to provide for the ready comparison of related factors.

Referring now to Fig. 2 I have shown the pressure chamber 1 as well as the associated mechanisms which I have described, mounted upon a base 29 which forms a pressure casing for a second differential pressure sensitive device. Within the pressure casing 29 is located a diaphragm 30 adapted to be positioned within the casing in accordance with the differential pressure impressed across it. For admitting pressures to opposite sides of the diaphragm 30, the pressure casing 29 is provided with pressure inlets 31 and 32. If this device is to be used to determine the rate of flow of the products of combustion through a boiler, for example, the inlet 32 may lead to the uptake of the boiler whereas the inlet 31 will lead to the furnace of the boiler. The diaphragm 30 will then be sensitive to the differential produced by the flow of the products of combustion through the boiler which, as is well known, varies as the square of the rate of flow of the products of combustion therethrough.

Secured to the diaphragm 30 is a shaft 33 arranged to transmit movement of the diaphragm 30 to a pointer 34 through a suitable geared transmitting system as shown. The shaft 33 is provided with a rack with which is meshed a gear driving shaft 50, carrying at its other end a second gear meshing with a rack 51. The rack 51 is guided in well known manner and is pivotally connected to an arm for angularly positioning the shaft to which is fastened the pointer 34.

To prevent leakage of the pressure fluid within the casing 29 through the openings through which the shaft 33 extends, diaphragms 35 are provided, sealed to the wall of the casing. The force produced by the differential pressure acting on the diaphragm 30 is counterbalanced by a cantilever spring 36, the effective length of which may be varied by an adjustable fulcrum 37 moved by a screw 38. The cantilever spring 36 is secured to a suitable bell crank 39 pivotally supported, and angularly adjustable by a thumb screw 40 so that the initial position of the diaphragm 30 and corresponding initial position of the pointer 34 may be readily adjusted. The shaft 33 extends through opposite sides of the casing 29 to prevent the possibility of end thrust which would be present if it extended solely in the one direction. To prevent the possibility of backlash and to take up any play in the moving parts, the end of the shaft 33 opposite to the cantilever spring 36, is connected to a cantilever spring 41 which is relatively weak compared to the cantilever spring 36 and has no appreciable effect upon movement of the diaphragm 30 produced by a given differential pressure. The shaft 33 is preferably connected to both the cantilever spring 36 and the cantilever spring 41 by flexible straps 42 so that it may be freely positioned within the opening in the walls of the pressure casing 29 and there will be no tendency to bind or otherwise cause misalignment of the parts with the consequent introduction of friction in the mechanism.

Considering the disclosure of Figs. 1 and 2; I have described in connection with the first a differential pressure responsive device of novel arrangement for continuously indicating, relative to the index 15, the rate of flow of steam from a vapor generator. In connection with Fig. 2 I have described a differential pressure responsive device for continuously indicating, relative to the index 15, the rate of flow of air and the products of combustion through the gas passages of the boiler. It is therefore apparent that the two pointers 9, 34, cooperating with the index 15, will continuously indicate attainment of or departure from desired relation between the rate of flow of steam from the boiler and the rate of flow of the air and products of combustion through the boiler. Adjustments 18, 40 are used to set the pointers at zero when the pressure of the atmosphere exists on both the interior and exterior of the bellows 2 and at opposite sides of the diaphragm 30. The adjustments 20, 38 are used to take care of the capacity of the two devices so that for maximum rate of flow of steam and maximum rate of flow of the products of combustion the pointers 9, 34 will travel over the full scale of the index 15.

At all times during the operation of the boiler, the device provides an indication of the maintenance of or departure from desirable relation between the two pointers relative to the index, and it is apparent that the pointers may be replaced by pens to give co-related pen tracings upon a single recording chart. Furthermore the linkage which actuates the pointers may be used to actuate control or regulating equipment responsive to the individual values of rate of flow or to the relation therebetween.

While I have described my improved device as indicating the magnitude of a differential pressure, it is evident that, for example, one or the other of the inlets 4 or 5 may be left open to the atmosphere and that the other connected to a single source of pressure so that the indicator 9 will indicate in cooperation with the scale 15 the magnitude of the single pressure or more exactly the difference between atmospheric pressure and that at the source to which the inlets 4 or 5 is connected.

What I claim as new, and desire to secure by Letters Patent of the United States, is:

1. In a pressure responsive device, in combination, a pressure chamber, a closed cylindrical bellows having a plurality of convolutions within said chamber, inlets for admitting pressures to the interior of said bellows and said chamber, a shaft connected to said bellows extending through an opening in the wall of said chamber, said opening being larger than the diameter of said shaft, a cylindrical bellows having a plurality of convolutions joined to said shaft and the wall of the chamber surrounding the opening, a pivotally supported spring flexibly connected to said shaft, an adjustable fulcrum for said spring between said pivot support and said flexible connection, and means for angularly positioning said spring about said pivot.

2. A relation gage, comprising in combination, a pressure sensitive diaphragm, an indicator, means operatively connecting said diaphragm to said indicator, a pressure responsive device, a second indicator, means operatively connecting said second indicator to said pressure responsive device, a spring operatively connected to said pressure responsive device for producing a displacement from an initial position in accordance with the magnitude of the pressure, means for varying the effective length of said spring, and a scale cooperating with said indicators.

3. A relation gage, comprising in combination, a casing, a diaphragm in said casing, means for admitting pressures to opposite sides of said diaphragm, a shaft connected to said diaphragm extending through an opening in said casing, said opening being larger than the diameter of said shaft, a diaphragm joined to said casing and to said shaft to prevent the escape of pressure fluid from said casing, a pivotally mounted spring flexibly connected to said shaft, means for angularly positioning said spring, an indicator, a scale cooperating with said indicator, operative means connecting said indicator with said diaphragm, a pressure chamber, a flexible cylindrical bellows having a plurality of convolutions within said chamber, inlets for admitting pressures to the interior of said bellows and said chamber, a shaft connected to said bellows extending through an opening in the wall of said chamber, said opening being larger than the diameter of said shaft, a cylindrical bellows having a plurality of convolutions joined to said shaft and the wall of the chamber surrounding the opening to prevent the escape of pressure fluid from said chamber, a pivotally supported spring flexibly connected to said shaft, an adjustable fulcrum for said spring between said pivot support and said flexible connection, means for angularly positioning said spring about said pivot, a second indicator adapted to cooperate with said scale, and means operatively connecting said second indicator to said pressure responsive device.

4. In combination, a movable member, a spring connected to said member, a pivot for supporting said spring, a bell crank supported by said pivot and having an arm extending substantially parallel with said spring; and a movable block positioned between said spring and arm.

5. In combination, a movable member, a cantilever spring connected to said member, a pivot for supporting said spring, a bell crank supported by said pivot and having an arm extending substantially parallel with said spring, a movable block positioned between said spring and arm; and adjustable means for positioning said bell crank and spring about said pivot.

6. In combination, responsive means, spring loading means connected to said responsive means, a pivot for supporting said spring, an adjustable fulcrum for said spring; and means for angularly positioning said spring and fulcrum about said pivot.

7. In a pressure responsive device, in combination, a pressure chamber, flexible means dividing the chamber and positioned responsive to a pressure differential, an indicator of the position of the flexible means, spring loading means for said flexible means to oppose the differential pressure, a pivoted support for said spring; and means for angularly adjusting said support.

8. A relation gage comprising in combination, a plurality of pressure chambers, flexible means in each chamber dividing the chamber and positioned responsive to a pressure differential, an indicator of the position of each of said flexible means, said indicators cooperating with a single index, a pivotally supported loading spring connected to one of said flexible means, an adjustable fulcrum for said spring between said pivot support and said connection, means for angularly positioning said spring about said pivot; and a loading spring for the other of said flexible means.

9. In a pressure responsive device in combination, flexible means positioned responsive to a pressure differential, an indicator of the position of the flexible means, spring loading means for said flexible means to oppose the differential pressure, a pivoted support for said spring, and means for angularly adjusting said spring about said support.

10. In a pressure responsive device, in combination, a pressure chamber, a pressure sensitive diaphragm within said chamber, a shaft connected to said diaphragm extending through an opening in the wall of said chamber, said opening being larger than the diameter of said shaft, a cantilever spring for opposing motion of said diaphragm disposed at substantially right angles to said shaft, and a flexible connection between said spring and shaft.

11. In a pressure responsive device, in combination, a pressure chamber, a pressure sensitive diaphragm within said chamber, a shaft connected to said diaphragm extending through an opening in the wall of said chamber, said opening being larger than the diameter of said shaft, a pliant pressure tight shield between said shaft and casing, a cantilever spring for opposing motion of said diaphragm disposed at substantially right angles to said shaft, and a flexible connection between said spring and shaft.

12. A relation gage, comprising in combination, a pressure sensitive diaphragm, an indicator, means operatively connecting said diaphragm to said indicator, a pressure responsive device, a second indicator, means operatively connecting said second indicator to said pressure responsive device, a spring operatively connected to said pressure responsive device for producing a displacement from an initial position in accordance with the magnitude of the pressure, means for progressively varying the effective length of said spring in accordance with the displacement of said pressure responsive device from the initial position, and a scale cooperating with said indicators.

13. A relation gage comprising in combination, a plurality of pressure chambers, flexible means in each chamber dividing the chamber and positioned responsive to a pressure differential, an indicator of the position of each of the flexible means, said indicators cooperating with a single index, spring loading means for each of the flexible means to oppose the differential pressure, and means for varying the effective lengths of the spring loading means.

CLARENCE JOHNSON.